US009479437B1

United States Patent
Zhou et al.

(10) Patent No.: US 9,479,437 B1
(45) Date of Patent: Oct. 25, 2016

(54) EFFICIENT UPDATES OF WEIGHTED COST MULTIPATH (WCMP) GROUPS

(71) Applicant: Google Inc., Mountain View, CA (US)

(72) Inventors: Junlan Zhou, Mountain View, CA (US); Amin Vahdat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 355 days.

(21) Appl. No.: 14/137,044

(22) Filed: Dec. 20, 2013

(51) Int. Cl.
| | |
|---|---|
| *H04L 12/26* | (2006.01) |
| *H04L 12/54* | (2013.01) |
| *H04L 12/751* | (2013.01) |
| *H04L 12/28* | (2006.01) |
| *H04L 12/803* | (2013.01) |
| *H04L 12/707* | (2013.01) |

(52) U.S. Cl.
CPC ............. *H04L 47/122* (2013.01); *H04L 45/24* (2013.01)

(58) Field of Classification Search
CPC ........... H04L 12/6418; H04L 43/0888; H04L 43/16; H04L 45/125
USPC .......................... 370/235, 229, 255; 709/241
See application file for complete search history.

(56) References Cited

U.S. PATENT DOCUMENTS

| | | | | |
|---|---|---|---|---|
| 5,488,608 A * | 1/1996 | Flammer, III | .......... | H04L 45/00 370/400 |
| 7,072,980 B2 * | 7/2006 | Brown | ................ | H04L 12/5602 709/239 |
| 7,277,425 B1 * | 10/2007 | Sikdar | ................ | H04L 12/5601 370/351 |
| 7,366,100 B2 * | 4/2008 | Anderson | ............... | H04L 45/02 370/237 |
| 7,505,402 B2 * | 3/2009 | Filsfils | .................... | H04L 12/66 370/217 |
| 7,864,765 B2 * | 1/2011 | Borkenhagen | .......... | H04L 45/02 370/237 |
| 7,987,288 B2 * | 7/2011 | Charzinski | ............. | H04L 45/00 370/218 |
| 8,139,492 B1 * | 3/2012 | Peterson | ................ | H04L 45/00 370/238 |
| 8,370,523 B1 * | 2/2013 | Slaughter | .............. | H04L 45/742 709/238 |
| 8,873,563 B2 * | 10/2014 | Sen | ......................... | H04L 45/00 370/392 |
| 8,873,567 B1 * | 10/2014 | Mandal | ................... | H04L 12/26 370/400 |
| 8,902,751 B1 * | 12/2014 | Zhou | .................... | H04L 12/6418 370/235 |
| 9,054,974 B2 * | 6/2015 | Bettink | .................... | H04L 47/10 |
| 2002/0080798 A1 * | 6/2002 | Hariguchi | ............... | H04L 45/00 370/395.31 |
| 2003/0223424 A1 * | 12/2003 | Anderson | ............... | H04L 45/02 370/392 |
| 2004/0010712 A1 * | 1/2004 | Hui | ...................... | H04L 63/0227 726/15 |
| 2004/0264380 A1 * | 12/2004 | Kalkunte | ................ | H04L 45/00 370/238 |
| 2004/0264384 A1 * | 12/2004 | Deval | ..................... | H04L 45/02 370/252 |

(Continued)

*Primary Examiner* — Wutchung Chu
(74) *Attorney, Agent, or Firm* — McDermott Will & Emery LLP

(57) ABSTRACT

Exemplary embodiments provide changes to routing schemes, i.e. WCMP groups or WCMP sets, installed in a network traffic distribution table, e.g. multipath table. WCMP groups of a multipath table are updated to accommodate a new WCMP group. This can be achieved by reducing the size of the existing WCMP groups on the multipath table. The goal is to reduce the existing WCMP groups just enough to make room for the new WCMP group. An objective is to minimize the number of existing WCMP groups to be reduced before a new WCMP group can be installed in the multipath table.

20 Claims, 5 Drawing Sheets

(56) References Cited

U.S. PATENT DOCUMENTS

| | | | |
|---|---|---|---|
| 2005/0100035 A1* | 5/2005 | Chiou | H04L 12/5693 370/412 |
| 2005/0163045 A1* | 7/2005 | Randriamasy | H04L 47/125 370/229 |
| 2006/0067228 A1* | 3/2006 | Ronciak | H04L 47/10 370/235 |
| 2006/0155872 A1* | 7/2006 | Charzinski | H04L 45/04 709/238 |
| 2007/0110079 A1* | 5/2007 | Schollmeier | H04L 45/00 370/400 |
| 2007/0237153 A1* | 10/2007 | Slaughter | H04L 45/02 370/392 |
| 2008/0085702 A1* | 4/2008 | Park | H04W 40/28 455/422.1 |
| 2009/0168664 A1* | 7/2009 | Washburn | H04L 41/12 370/254 |
| 2010/0118718 A1* | 5/2010 | Kobayashi | H04L 47/10 370/252 |
| 2010/0329154 A1* | 12/2010 | Charzinski | H04L 45/42 370/255 |
| 2012/0057466 A1* | 3/2012 | Allan | H04L 45/125 370/238 |
| 2012/0201252 A1* | 8/2012 | Subramanian | H04L 45/125 370/401 |
| 2013/0024649 A1* | 1/2013 | Guo | H04L 45/54 711/207 |
| 2013/0339544 A1* | 12/2013 | Mithyantha | H04L 45/02 709/238 |

* cited by examiner

EFFICIENT UPDATES OF WEIGHTED COST MULTIPATH (WCMP) GROUPS

BACKGROUND

In conventional networks, various routing techniques may be used to transport data packets through the network. There may be multiple paths to transport the data packets between two nodes of the network. The network may be configured to split the traffic among these multiple paths. For example, a multipath routing technique may be used to determine how the traffic will be split among the multiple paths in the network. Exemplary multipath routing techniques may include Weighted Cost MultiPath (WCMP) routing and Equal Cost MultiPath (ECMP) routing. WCMP routing technique may distribute the traffic among available paths based on a set of pre-determined ratios. To deal with uneven path capacities due to asymmetric connectivity among network switches, the routing protocols may set up WCMP groups on the switches for weighted traffic distribution among the multipath paths. If the pre-determined ratios are equal, the WCMP routing may be an ECMP routing where the traffic is distributed evenly among the available paths. The ECMP groups set up on the switches may hash the traffic equally among the multiple egress ports comprising an ECMP group.

An ECMP group is formed when the multipath table of a switch in the network contains multiple next-hop addresses for the same destination with equal cost. A WCMP group is formed when the multipath table of a switch in the network contains multiple next-hop addresses for the same destination with varying cost. A hash algorithm may be used to choose one of the next-hop addresses in the ECMP group or the WCMP group to install in the multipath table.

The WCMP groups often need to be updated to adapt to changes in network topologies and traffic demand. In conventional networks, WCMP group updates are very costly, involving many hardware table accesses. Particularly when the multipath table storing WCMP groups is almost full, adding or expanding a single WCMP group requires reducing the size of existing WCMP groups already installed in the multipath table of the switch. The long delay in updating WCMP groups may result in slow route convergence and high traffic loss in networks after failure events. Therefore, a technique is needed to reduce the hardware table access and thus to reduce the processing time of updating WCMP groups on the switches.

SUMMARY

Various embodiments provide a computer-implemented method comprising providing a network traffic distribution table storing a plurality of routing schemes. The method further includes providing at least one additional routing scheme to be added to the table. One or more of the plurality of routing schemes are identified for reduction. A minimum number of the identified one or more of the plurality of routing schemes are reduced. The reducing releases enough storage space at the table for adding the at least one additional routing scheme. The at least one additional routing scheme is added to the table, and the network traffic is rerouted using the at least one additional routing scheme.

In some embodiments, a computer-implemented method provides a network traffic distribution table that stores routing schemes. Each routing scheme occupies a storage space S in the table. The method further includes providing an additional routing scheme to be added to the table. The additional routing scheme requires a storage space $S_1$. One or more of the routing schemes are identified for reducing. Reducing a given routing scheme reduces the storage space S occupied by the given routing scheme to a reduced storage space $S_R$. Storage space $S_f$ released by reducing the given routing scheme is equivalent to a difference between the storage space S and the reduced storage space $S_R$ of the given routing scheme. For each of the identified one or more routing schemes, $S_f$ is less than or equal to $S_1$. The method further includes reducing a minimum number of the identified one or more routing schemes to release enough storage space at the table for adding the at least one additional routing scheme. The at least one additional routing scheme is added to the table. The network traffic is rerouted using the at least one additional routing scheme.

Various embodiments provide a non-transitory medium storing instructions, that when executed by a processor, cause the processor to provide a network traffic distribution table storing routing schemes. The instructions further cause the processor to provide an additional routing scheme to be added to the table. A portion of the routing schemes is identified for reducing. Reducing the portion of routing schemes releases enough storage space at the table for adding the additional routing scheme. If the portion of the routing schemes includes a single routing scheme, the single routing scheme is reduced. If the portion of the routing scheme includes more than one routing schemes, an elimination test is applied to eliminate one or more routing schemes from the portion of the routing schemes. Remaining one or more routing scheme in the portion of the routing schemes are reduced. The additional routing scheme is added to the table. The network traffic is rerouted using the additional routing scheme.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Exemplary embodiments of the present invention concerns changes to routing schemes (such as WCMP groups or WCMP sets) installed in a network traffic distribution table, (e.g., a multipath table). More specifically, the invention is directed to updating WCMP groups of a multipath table to accommodate a new WCMP group. This can be achieved by reducing the size of the existing WCMP groups on the multipath table. The goal of the reducing is to reduce the existing WCMP groups just enough to make room for the new WCMP group. An important objective is to minimize the number of existing WCMP groups to be reduced before a new WCMP group can be installed in the multipath table. Throughout the description, the groups installed on the multipath table are referred as "WCMP groups" and the new group to be added to the multipath table is referred as "WCMP group". One of ordinary skill in the art will appreciate that the teachings of the present application may be applied to ECMP groups with no or minor modifications.

Figure 1:
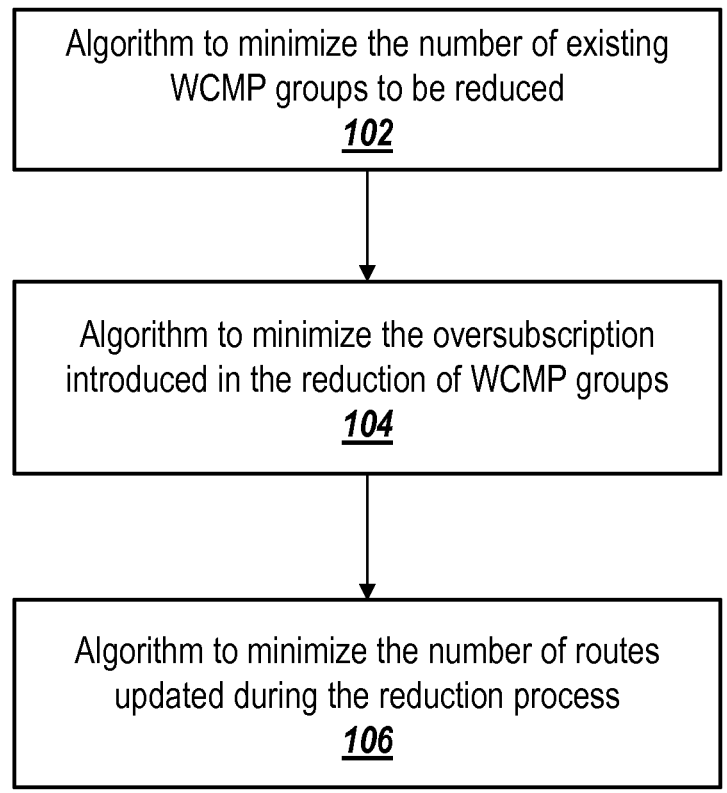
FIG. 1 is a flowchart describing an exemplary reduction process of existing WCMP groups on a multipath table.

As illustrated in FIG. 1, the technique may be implemented using three algorithms. The first algorithm 102 aims to minimize the number of existing WCMP groups to be reduced. A WCMP group associated with a forwarding device, such as a switch, includes the weights associated with the ports of the forwarding device. For example, the WCMP group {1, 2} indicates that the first port of the switch gets ⅓ of the total traffic while the second port gets ⅔ of the total traffic. The exemplary WCMP group {1, 2} may be reduced to {1, 1}. In the reduced WCMP group, the first port gets more traffic than before.

A given WCMP group occupies a given number of entries (i.e. space) on the multipath table. The space can be reduced to create available space for the new group. Thus, the goal at the first algorithm 102 of FIG. 1 is to identify WCMP groups with significant reduction enough so that there is available space in the multipath table for installing the new WCMP group. If multiple WCMP groups are identified for reduction using the first algorithm 102, a second algorithm 104 may be performed.

The second algorithm 104 aims to minimize the oversubscription in the WCMP group to be reduced. When a WCMP group is reduced, oversubscription may be introduced due to the increased traffic at the ports of the switch. Referring back to the exemplary WCMP group {1, 2}, reducing the group to {1, 1} results in the first port getting more traffic than before. Thus an oversubscription is created at the first port as a result of the reduction. The WCMP groups with lower oversubscription after reduction are selected in the second algorithm 104 of FIG. 1. If multiple WCMP groups are identified in the second algorithm 104, a third algorithm 106 may be performed.

The third algorithm 106 aims to minimize the number of routes updated during the reduction process. Reduction of a WCMP group requires updating all the forwarding rules referencing the WCMP group. Fewer multipath table accesses are required for a WCMP group with lower reference count, i.e. number of routes. Thus, selecting a WCMP group with a lower reference count minimizes the number of routes that will be updated. At the third algorithm 106, the WCMP group(s) with lowest reference count is selected among WCMP groups with identical oversubscription after the reduction step.

The foregoing algorithms 102, 104, 106 are applied in the order set forth above. If the first algorithm 102 results in identifying a single WCMP group for reduction, the algorithms that follow (i.e. algorithms 2 and 3) are not applied. Thus, the technique trades-off the network throughput for fewer WCMP group updates and thus, faster route convergence time. Similarly, if the second algorithm results in identifying a single WCMP group for reduction, the following algorithm (i.e. algorithm 3) is not applied. Thus, the technique also trades-off the total saving of the multipath table entries for the network throughput. The first trade-off is prioritized over the second trade-off.

The technique described herein may be applied using a "make-before-break" approach. That is, once the new WCMP group with reduced weights is created, the traffic is re-routed using the new WCMP group before removing the old WCMP group. For example, the input parameters may be defined as follows:

S: the set of existing WCMP groups installed in the multipath table,

G: a WCMP group to be added to the multipath table, $\delta_k(G)$max: the maximum acceptable oversubscription incurred by WCMP group reduction. This is a user-defined parameter based on acceptable levels of traffic loss incurred as a result of over-subscription.

For a WCMP group of G of N ports, $W_k(G)$ may denote the weight of member port k. $\delta_k(G)$, the maximum amount of traffic to be scheduled to port k may be derived as follows:

$$\delta_k(G) = D \cdot \frac{W_k(G)}{\sum_{i=1}^{N} W_i(G)}$$

where D represents the traffic demand to be load balanced among the N ports of the WCMP group. If G is reduced to G', the traffic demand to be scheduled to port k may be expressed as:

$$\delta_k(G') = D \cdot \frac{W_k(G')}{\sum_{i=1}^{N} W_i(G')}$$

The oversubscription incurred by such reduction would be:

$$\Delta(G:G') = \max\left(\frac{\delta_k(G')}{\delta_k(G)}\right) \text{ where } 1 \leq k \leq N$$

Figure 2:
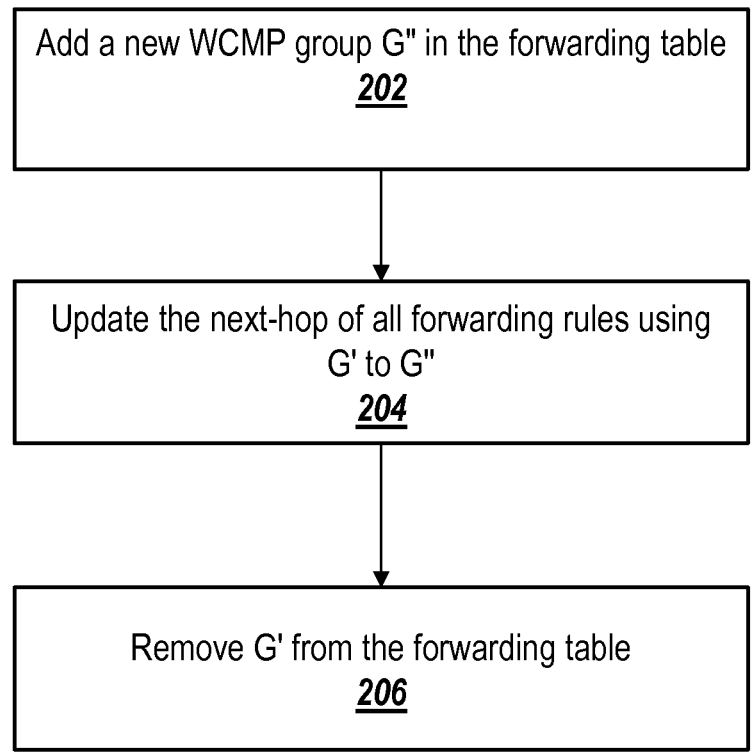
FIG. 2 is a flowchart describing the "make-before-break" procedure in adding new WCMP groups to a multipath table.

FIG. 2 is a flowchart illustrating the make-before-break approach in adding a new WCMP group to a multipath table. At step 202, the new WCMP group G" is added to the multipath table. At step 204, the next-hop of all forwarding rules using the existing WCMP group G' are updated to G". At step 206, the existing WCMP group G' is removed from the multipath table.

Figure 3:
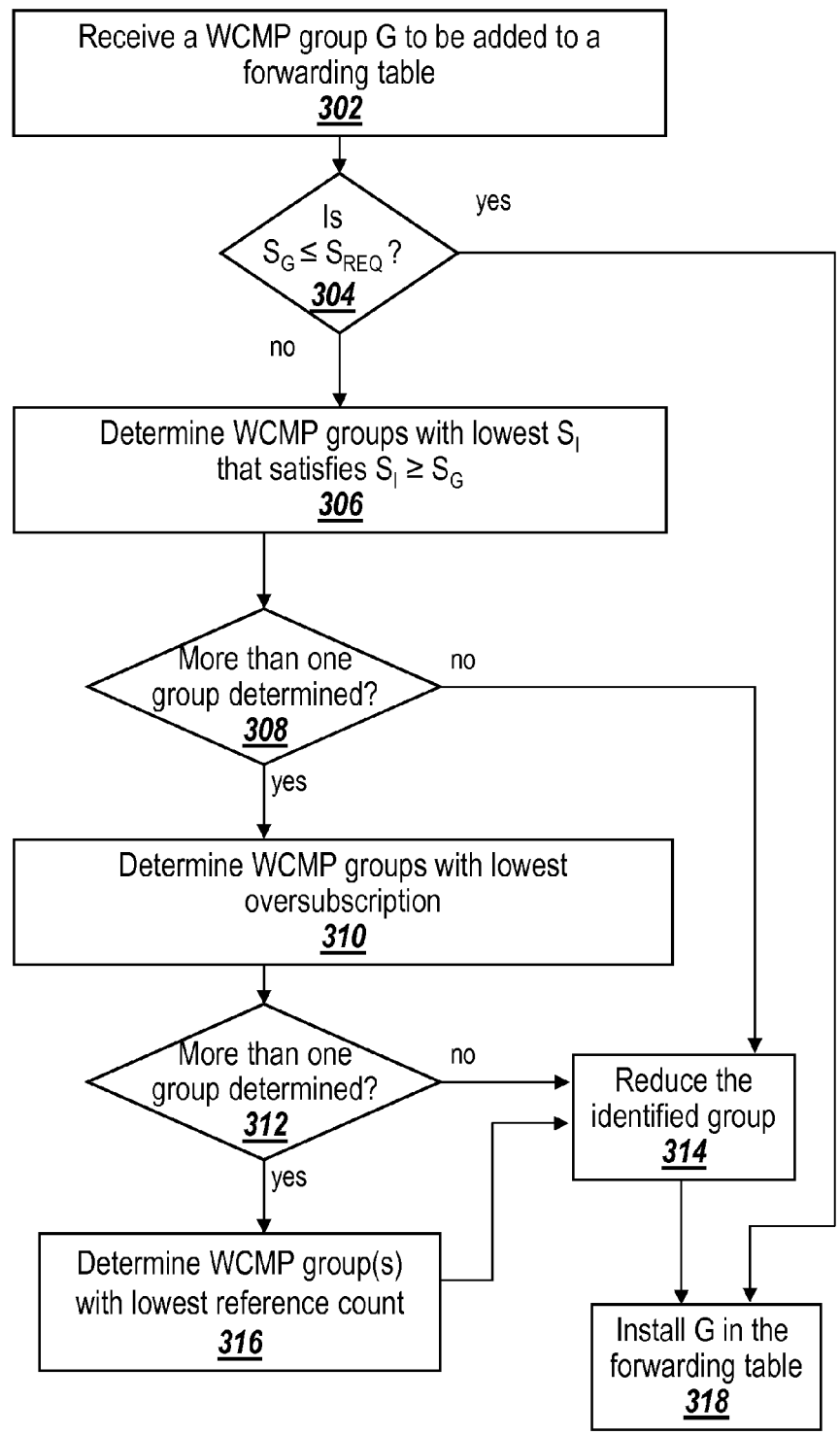
FIG. 3 is a flowchart describing how to program an additional WCMP group to a multipath table.

FIG. 3 is a flowchart describing how to install an additional WCMP group in a multipath table. At step 302, a WCMP group is received to be added, i.e. programmed in, to a multipath table. The multipath table may include a plurality existing WCMP groups already installed in the multipath table.

At decision step 304, it is determined whether the number of required free entries $S_{REQ}$ at the multipath table is equal to or greater than the space required for adding the new WCMP group, i.e. the memory space that the WCMP group $S_G$ occupies as number of entries. For embodiments implementing the make-before-break approach, scratch pad may be used. The scratch pad ensures zero packet loss in modifying an existing WCMP group. The scratch pad may be eliminated for maximal utilization of the multipath table for embodiments that do not require zero packet loss. For the make-before-break approach, the size of the scratch pad may be added to the $S_{REQ}$, the number of required free entries at the multipath table. The size of scratch pad is the maximum size of any WCMP group to be installed into the multipath table. For embodiments not implementing the make-before-break approach, the number of required free entries at the multipath table is equivalent to the number of available entries of the multipath table.

If the decision step 304 evaluates to "YES", i.e. there is enough free space at the multipath table, the new WCMP group is installed in the multipath table without reducing the existing WCMP groups (step 318). If the decision step 304 evaluates to "NO", i.e. there is not enough free space at the multipath table, reduction is to be performed at the multipath table.

At step 306, a subset of existing WCMP groups are identified for reduction. The subset of WCMP groups is identified based on the space to be freed $S_f$ on the multipath table by reducing the WCMP groups. The space to be freed $S_f$ must be equal to or greater than the size of the new WCMP group, $S_G$.

At decision step 308, it is determined whether more than one of the existing WCMP groups are identified at step 306, i.e. whether the subset of WCMP groups includes more than one existing WCMP group. If the decision step 308 evaluates to "NO", i.e. only one existing WCMP group is identified for reduction, the method proceeds to step 314 to reduce the identified existing WCMP group.

If the decision step 308 evaluates to "YES", i.e. more than one existing WCMP groups are identified at step 306, the method proceeds to step 310. At step 310, WCMP groups having the lowest oversubscription are identified.

At decision step 312, it is determined whether more than one of the existing WCMP groups are identified at step 310. If the decision step 312 evaluates to "NO", i.e. only one existing WCMP group is identified for reduction, the method proceeds to step 314 to reduce the identified existing WCMP group.

If the decision step 312 evaluates to "YES", i.e. more than one existing WCMP groups are identified at step 310, the method proceeds to step 316. At step 316, WCMP groups having the lowest reference count, i.e. lowest number of routes using the WCMP group as the next-hop, are identified. The identified the WCMP group(s) with lowest reference count are reduced at step 314.

At step 316, the WCMP group G is installed in the multipath table using the space freed up at step 314.

The foregoing steps are explained below in connection with an illustrative example. The following example is provided for illustrative purposes only and should not be construed as limiting.

In this example, the multipath table currently stores the below set of 4 WCMP groups, with a total size of 220 entries. Each WCMP group is used by a number of routes as the forwarding action, which is defined as its reference count. The capacity of the multipath table is 350, and a scratch pad of 100 entries is reserved for implementing the make-before-break approach.

```
int wcmp_groups[ ][4]={
 {30, 13, 13, 13}, // reference count=50
 {24, 11, 11, 11}, // reference count=23
 {24, 11, 11, 11}, // reference count=29
 {10, 9, 9 9,}, // reference count=60
};
```

Excluding the scratch pad, the multipath table has 30 free entries. A new WCMP group as shown below is to be installed in the multipath table.

```
int new_wcmp_group[4]={
 11, 10, 10, 10
};
```

The new WCMP group requires a minimum of 37 free multipath table entries, if the acceptable oversubscription is 1.01. Therefore, some of existing WCMP groups need to be reduced to free up 7 or more multipath table entries. Next, the reduction process is described.

First, the maximum reduction of existing WCMP groups is calculated for a given oversubscription threshold. Then, the minimum number of WCMP groups are determined that need to be reduced to free up enough space required for installing the new WCMP group. Assuming the user-defined oversubscription threshold is 1.01, the maximum reduction of WCMP groups in this example are listed below.

WCMP group {30, 13, 13, 13} can be reduced by 32 multipath table entries while incurring the oversubscription of 1.004

WCMP group {24, 11, 11, 11} can be reduced by 26 multipath table entries while incurring the oversubscription of 1.0029

WCMP group {24, 11, 11, 11} can be reduced by 26 multipath table entries while incurring the oversubscription of 1.0029.

WCMP group {10, 9, 9 9,} can be reduced by 4 multipath table entries while incurring the oversubscription of 1.009.

These results suggest that 3 out of 4 existing WCMP groups can each be reduced by more than 7 multipath table entries, which is the minimum space required for installing the new WCMP group. The reduction of WCMP group {10, 9, 9 9,} does not provide enough free space for installing the new WCMP group in the multipath table. Thus, this WCMP group is not considered for reduction. At the end of this step, it is determined that at most one existing WCMP group needs to be updated, before the new WCMP group is installed. In this example, existing WCMP groups need to be reduced to free 7 entries in the multipath table, as required by the new WCMP group to be installed in the multipath table. At the end of this step, it is determined that 3 out of 4 existing WCMP groups may each be reduced by 7 or more entries, thus enough space may be freed by reducing only one WCMP group.

Three WCMP groups are identified in the previous step: {30, 13, 13, 13}, {24, 11, 11, 11}, and {24, 11, 11, 11}. Each of these WCMP groups can be reduced to make enough space for the new WCMP group. In this step, {24, 11, 11, 11} and {24, 11, 11, 11} are selected as two alternative candidates for reduction because they lead to lower oversubscription, i.e. 1.0029 associated with {24, 11, 11, 11} and {24, 11, 11, 11} is less than 1.004 associated with {30, 13, 13, 13}.

Lastly, the WCMP group with lowest reference count (i.e. number of routes using the WCMP group as the next-hop) is selected as the final candidate for reduction. As reduction of WCMP group requires updating all the forwarding rules referencing the WCMP group, fewer hardware table accesses would be required if a WCMP group with lower reference count is selected for reduction. The reference count associated with each WCMP group is known when the groups are installed in the multipath table. Therefore, in this example, the WCMP group {24, 11, 11, 11} with reference count of 23 is selected for reduction.

The foregoing technique may be applied using the following exemplary pseudocode. The exemplary pseudocode provides a greedy solution and is efficient in time and space complexity. One of ordinary skill in the art will appreciate that the following pseudocode is provided for illustrative purposes only and other pseudocode may be developed to implement the foregoing technique.

As discussed above in connection with FIG. 3, if the entire member set of WCMP groups G can be installed in the multipath table, i.e. if the number of free entries in the multipath table is equal to or greater than the size of G, G is installed in the multipath table.

```
if (TotalSize(S)+TotalSize(G)<=ECMP_TABLE_SIZE-
 MAX_WCMP_GROUP_SIZE){ProgramWcmpGroup
 (G);
return;}
```

MAX_WCMP_GROUP_SIZE may represent a scratch pad. The scratch pad of size MAX_WCMP_GROUP_SIZE is only required for embodiments implementing make-before-break approach discussed in connection with FIG. 2. The scratch pad ensures zero packet loss in modifying an existing WCMP group. The scratch pad may be eliminated for maximal utilization of the multipath table for embodiments that do not require zero packet loss.

If the number of free entries in the multipath table is less than the size of G, the algorithm calculates Kmin, the minimum number of WCMP groups to be reduced for installing G given the oversubscription threshold of δmax. As provided above, max is a user-defined parameter. In this step, a small set of existing WCMP groups is identified such that the identified WCMP groups can be significantly reduced in size.

```
ReduceWcmpGroup(G, G', δmax);
entries_needed=max(0,
    TotalSize(G')+TotalSize(S)-ECMP_TABLE_SIZE-
        MAX_WCMP_GROUP_SIZE);
Kmin=CalcMinNumWcmpGroupsToReduce(S, S',
    entries_needed, δmax);
int CalcMinNumWcmpGroupsToReduce(S, S',
    entries_needed, δmax) {int entries_to_reduce_per_group
    [S.num_groups];
    for (int i=0; i<S.num_groups; i++) {
    ReduceWcmpGroup(S[i], S'[i], δmax);
    entries_to_reduce_per_group[i]=S[i]-S'[i];
    }
    // Sort the elements in entries_to_reduce_per_group in
        decreasing values sort(entries_to_reduce_per_group);
    Kmin=0;
    int total_entries_to_free=0;
    while (total_entries_to_free<entries_needed) {
    total_entries_to_free+=entries_to_reduce_per_group
        [Kmin];
    ++Kmin;
    }
    return Kmin;
}
```

Next, the minimum oversubscription min is determined. δmin is the minimum achievable oversubscription for reducing only Kmin number of existing WCMP groups to make enough space for G.

```
ReduceWcmpGroup(G, G', δmax);
entries_needed=max(0,  TotalSize(G')+TotalSize(S)-EC-
    MP_TABLE_SIZE-MAX_WCMP_GROUP_SIZE);
δmin=εmax
δtmp=δmax-ε
Gtmp=G'
// Keep reducing the oversubscription tmp until the minimum number of WCMP groups to // be reduced to make enough space for G exceeds Kmin
While (CalcMinNumWcmpGroupsToReduce(S, S',
    entries_needed, δtmp)==Kmin) {δmin=δtmp; G'=Gtmp;
    δtmp=ε
ReduceWcmpGroup(G, Gtmp, δtmp);
entries_needed=max(0,  TotalSize(G')+TotalSize(S)-EC-
    MP_TABLE_SIZE-MAX_WCMP_GROUP_SIZE);
}
```

Lastly, the set of Kmin number of existing WCMP groups with minimal reduction cost are identified. The reduction cost is measured by the total number of forwarding rules using the WCMP groups.

```
U=FindAllSubsets(S, Kmin); // Enumerate all subsets of
    Kmin WCMP groups, and store it // in U
int min_route_updates=inf;
For (int i=0; i<U.size( ) i++) {
int num_route_updates=0;
int total_reduction=0;
For (int j=0; j<Kmin; j++) {
    num_route_updates+=RefCount(U[i][j]);
    ReduceWcmpGroup(U[i], G", δmin);
    total_reduction+=TotalSize(U[i])-TotalSize(G");
}
// Skip this subset of Kmin WCMP groups as denoted by
U[i] if their aggregate
// reduction is smaller than the size of G'
if (total_reduction<entries_needed) continue;
// Cache U[i] as the best candidate for reduction if its
reduction cost as measured by
// the total number of forwarding rules using them is lower
than
// min_num_route_updates
if (num_route_updates<min_num_route_updates) {
    wcmp_groups_to_reduce=U[i];
    num_route_updates=min_num_route_updates;
}
}
```

Figure 4:
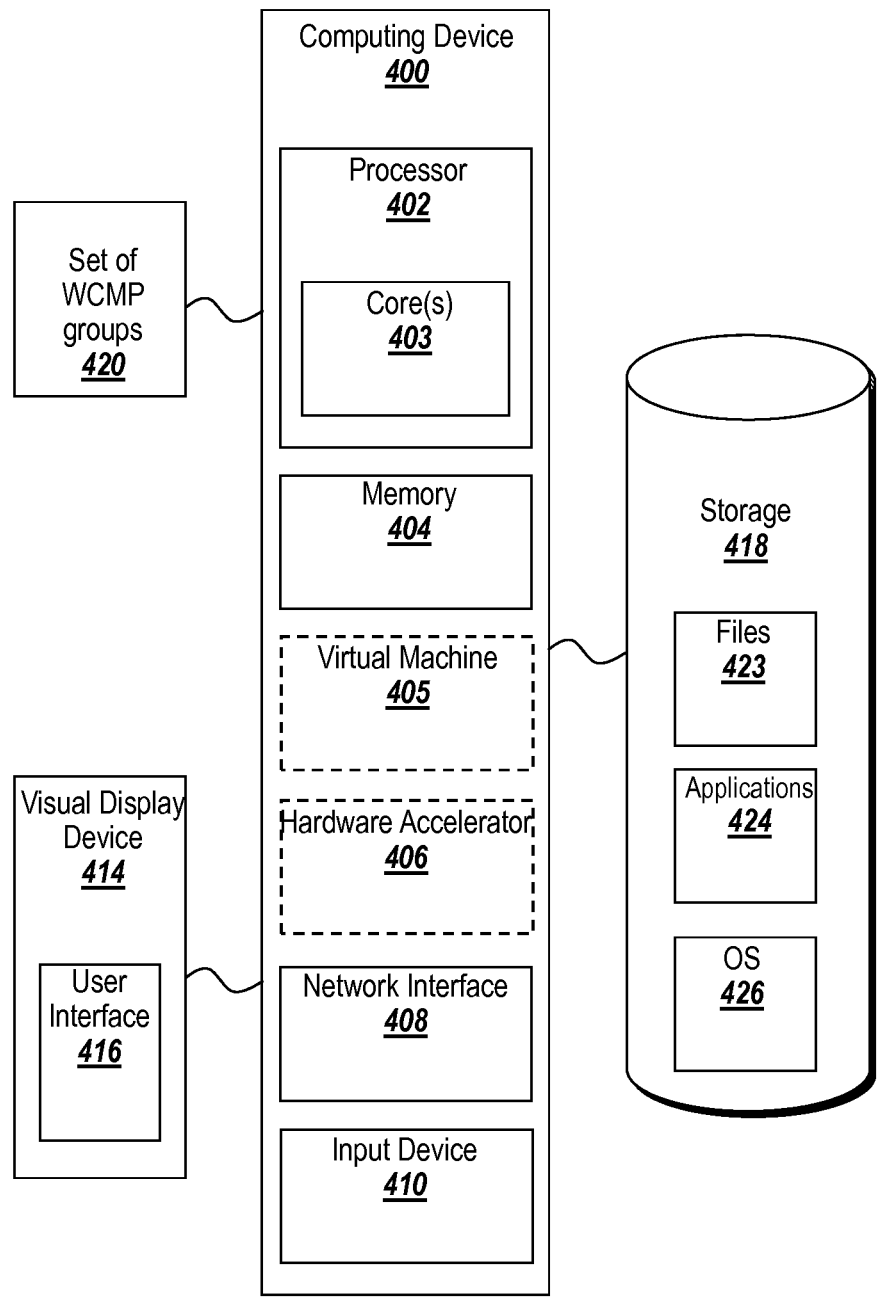
FIG. 4 depicts an exemplary computing device suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. In some embodiments the above-described acts may be performed by a control plane of one or more switching nodes in a communications network. The switching nodes may include one or more of a switch, a server with forwarding capabilities, a router, a bridge, etc. The switching nodes may incorporate or may be associated with the suitably-programmed electronic device. FIG. 4 depicts an example of an electronic device 400 (i.e. the suitably-programmed electronic device) that may be suitable for use with one or more acts disclosed herein.

The electronic device 400 may take many forms, including but not limited to a computer, workstation, server, network computer, quantum computer, optical computer, Internet appliance, mobile device, a pager, a tablet computer, a smart sensor, application specific processing device, etc.

The electronic device 400 is illustrative and may take other forms. For example, an alternative implementation of the electronic device 400 may have fewer components, more components, or components that are in a configuration that differs from the configuration of FIG. 4. The components of FIG. 4 and/or other figures described herein may be implemented using hardware based logic, software based logic and/or logic that is a combination of hardware and software based logic (e.g., hybrid logic); therefore, components illustrated in FIG. 4 and/or other figures are not limited to a specific type of logic.

The processor 402 may include hardware based logic or a combination of hardware based logic and software to execute instructions on behalf of the electronic device 400. The processor 402 may include logic that may interpret, execute, and/or otherwise process information contained in, for example, the memory 404. The information may include computer-executable instructions and/or data that may implement one or more embodiments of the invention. The processor 402 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 403. Moreover, the processor 402 may include a system-on-chip (SoC) or system-in-package (SiP).

The electronic device 400 may include one or more tangible non-transitory computer-readable storage media for storing one or more computer-executable instructions or software that may implement one or more embodiments of the invention. The non-transitory computer-readable storage media may be, for example, the memory 404 or the storage 418. The memory 404 may comprise a ternary content addressable memory (TCAM) and/or a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

One or more computing devices 400 may include a virtual machine (VM) 405 for executing the instructions loaded in the memory 404. A virtual machine 405 may be provided to handle a process running on multiple processors so that the process may appear to be using only one computing resource rather than multiple computing resources. Virtualization may be employed in the electronic device 400 so that infrastructure and resources in the electronic device may be shared dynamically. Multiple VMs 405 may be resident on a single computing device 400.

A hardware accelerator 406, may be implemented in an ASIC, FPGA, or some other device. The hardware accelerator 406 may be used to reduce the general processing time of the electronic device 400.

The electronic device 400 may include a network interface 408 to interface to a Local Area Network (LAN), Wide Area Network (WAN) or the Internet through a variety of connections including, but not limited to, standard telephone lines, LAN or WAN links (e.g., T1, T3, 76kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 408 may include a built-in network adapter, network interface card, personal computer memory card international association (PCMCIA) network card, card bus network adapter, wireless network adapter, universal serial bus (USB) network adapter, modem or any other device suitable for interfacing the electronic device 400 to any type of network capable of communication and performing the operations described herein.

The electronic device 400 may include one or more input devices 410, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 400 may include other suitable I/O peripherals.

The input devices 410 may allow a user to provide input that is registered on a visual display device 414. A graphical user interface (GUI) 416 may be shown on the display device 414. The input devices may allow a user to provide one or more WCMP groups 420 to be added to a multipath table using the computing device 400. The one or more WCMP groups 420 may be added to the multipath table using the technique described above.

A storage device 418 may also be associated with the computer 400. The storage device 418 may be accessible to the processor 402 via an I/O bus. The information may be executed, interpreted, manipulated, and/or otherwise processed by the processor 402. The storage device 418 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 418 may further store applications 424, and the electronic device 400 can be running an operating system (OS) 426. Examples of OS 426 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 5:
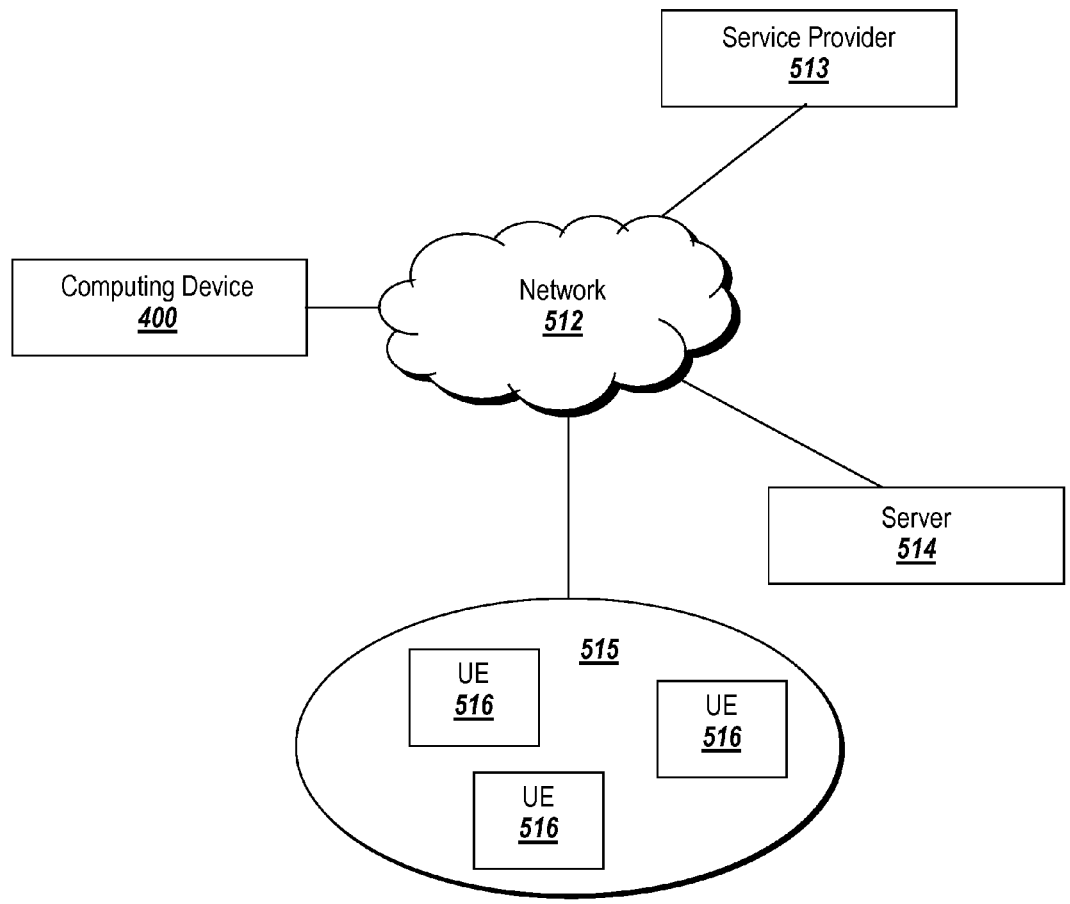
FIG. 5 depicts an exemplary network implementation of processing performed according to an exemplary embodiment.

FIG. 5 depicts a network implementation that may implement one or more embodiments of the invention. A system 500 may include the computing device 400, a network 512, a service provider 513, a target environment 514, and a cluster 515. The system 500 may be a distributed system including a plurality of computing nodes, i.e. units of execution 516, that implement one or more embodiments of the invention. The embodiment of FIG. 5 is exemplary, and other embodiments can include more devices, fewer devices, or devices in arrangements that differ from the arrangement of FIG. 5.

The network 512 may transport data from a source to a destination. Embodiments of the network 512 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 400, the service provider 513, etc.). Data may include digital information or analog information. Data may further be packetized and/or non-packetized.

The network 512 may be a hardwired network using wired conductors and/or optical fibers and/or may be a wireless network using free-space optical, radio frequency (RF), and/or acoustic transmission paths. In one implementation, the network 512 may be a substantially open public network, such as the Internet. In another implementation, the network 512 may be a more restricted network, such as a corporate virtual network. The network 512 may include Internet, intranet, Local Area Network (LAN), Wide Area Network (WAN), Metropolitan Area Network (MAN), wireless network (e.g., using IEEE 802.11), or other type of network The network 512 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 513 may include a device that makes a service available to another device. For example, the service provider 513 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf The server 514 may include a device that receives information over the network 512. For example, the server 514 may be a device that receives user input from the computer 400.

The cluster 515 may include a number of units of execution (UEs) 516 and may perform processing on behalf of the computer 400 and/or another device, such as the service provider 513 or server 514. For example, the cluster 515 may perform parallel processing on an operation received from the computer 400. The cluster 515 may include UEs 516 that reside on a single device or chip or that reside on a number of devices or chips.

The units of execution (UEs) 516 may include processing devices that perform operations on behalf of a device, such as a requesting device. A UE may be a microprocessor, field programmable gate array (FPGA), and/or another type of processing device. UE 516 may include code, such as code for an operating environment. For example, a UE may run a portion of an operating environment that pertains to parallel processing activities. The service provider 513 may operate the cluster 515 and may provide interactive optimization capabilities to the computer 400 on a subscription basis (e.g., via a web service).

Units of Execution (UEs) may provide remote/distributed processing capabilities for the applications 524. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless stated otherwise. The conjunction "or" is meant to be inclusive, unless stated otherwise.

It is intended that the invention not be limited to the particular embodiments disclosed above, but that the invention will include any and all particular embodiments and equivalents falling within the scope of the following appended claims.

The invention claimed is:

1. A computer-implemented method comprising:
providing a network traffic distribution table (the "table") storing a plurality of routing schemes for a forwarding device, each routing scheme occupying a corresponding number of entries in the table;
providing at least one additional routing scheme to be added to the table;
identifying one or more routing schemes of the plurality of routing schemes for reduction;
reducing a minimum number of the identified one or more routing schemes by, for each routing scheme to be reduced, reducing the corresponding number of entries in the table occupied by the respective routing scheme, such that the reducing releases enough storage space at the table for adding the at least one additional routing scheme while retaining, for each reduced routing scheme, at least one corresponding entry in the table; and causing the forwarding device to forward network traffic using the at least one additional routing scheme by updating the network traffic distribution table of the forwarding device with the at least one additional routing scheme.

2. The method of claim 1, wherein each routing scheme defines how network traffic is to be distributed among multiple ports of the forwarding device in the network.

3. The method of claim 1, further comprising:
when more than one routing schemes are identified, determining oversubscription created by reducing each of the identified routing schemes;
comparing the oversubscription of each of the identified routing schemes to a threshold value; and
determining a subset of the identified routing schemes based on the comparing, wherein the subset of the identified routing schemes is equivalent to the minimum number of the identified one or more of the plurality of routing schemes.

4. The method of claim 3, wherein the subset of the identified routing schemes have lowest oversubscriptions among the identified routing schemes.

5. The method of claim 3, further comprising:
when the subset of the identified routing schemes includes more than one routing scheme, determining a reference count associated with each routing scheme of the subset, wherein the reference count identified for each routing scheme is equal to number of routes in the network using the routing scheme for forwarding the network traffic; and
determining one or more of the subset of the identified routing schemes with lowest reference counts, wherein the one or more of the subset of the identified routing schemes is equivalent to the minimum number of the identified one or more of the plurality of routing schemes.

6. The method of claim 1, wherein the routing schemes are weighted cost multipath (WCMP) groups.

7. A computer-implemented method comprising:
providing a network traffic distribution table (the "table") storing routing schemes for a forwarding device, wherein each routing scheme occupies a corresponding number of entries using a storage space S in the table;
providing an additional routing scheme to be added to the table, wherein the additional routing scheme requires a storage space $S_1$;
identifying one or more of the routing schemes for reducing, wherein:
reducing a given routing scheme reduces the storage space S occupied by the given routing scheme to a reduced storage space $S_R$,
storage space $S_I$ released by reducing the given routing scheme is equivalent to a difference between the storage space S and the reduced storage space $S_R$ of the given routing scheme, and
for each of the identified one or more routing schemes, $S_I$ is less than or equal to the required storage space $S_1$;
reducing a minimum number of the identified one or more routing schemes by, for each routing scheme to be reduced, reducing the corresponding number of entries in the table occupied by the respective routing scheme, such that the reducing releases enough storage space at the table for adding the at least one additional routing scheme while retaining, for each reduced routing scheme, at least one corresponding entry in the table; and causing the forwarding device to forward network traffic using the at least one additional routing scheme by updating the network traffic distribution table of the forwarding device with the at least one additional routing scheme.

8. The method of claim 7, wherein each routing scheme defines how network traffic is to be distributed among multiple ports of the forwarding device in the network.

9. The method of claim 7, further comprising:
when more than one routing schemes are identified, determining a magnitude of oversubscription created by reducing each of the identified routing schemes;
comparing the magnitude of oversubscription of each of the identified routing schemes to a threshold value; and
determining a subset of the identified routing schemes based on the comparing, wherein the subset of the identified routing schemes is equivalent to the minimum number of the identified one or more of the plurality of routing schemes.

10. The method of claim 9, wherein the subset of the identified routing schemes have lowest magnitudes of oversubscription among the identified routing schemes.

11. The method of claim 9, further comprising:
when the subset of the identified routing schemes includes more than one routing scheme, determine a reference count associated with each routing scheme of the subset, wherein the reference count is equal to number of routes using the routing scheme for forwarding the network traffic; and
determining one or more of the subset of the identified routing schemes with lowest reference counts, wherein the one or more of the subset of the identified routing schemes is equivalent to the minimum number of the identified one or more of the plurality of routing schemes.

12. The method of claim 7, wherein the routing schemes are weighted cost multipath (WCMP) groups.

13. A non-transitory medium storing instructions, that when executed by a processor, cause the processor to:
provide a network traffic distribution table (the "table") storing routing schemes for a forwarding device, each routing scheme occupying a corresponding number of entries in the table;
provide an additional routing scheme to be added to the table;
identify a portion of the routing schemes for reducing, wherein reducing the portion of routing schemes releases enough storage space at the table for adding the additional routing scheme;
if the portion of the routing schemes includes a single routing scheme, reduce the single routing scheme while retaining at least one corresponding entry in the table for the single routing scheme;
if the portion of the routing scheme includes more than one routing schemes:
apply an elimination test to eliminate one or more routing schemes from the portion of the routing schemes, and
reduce at least one remaining routing scheme in the portion of the routing schemes while retaining, for each reduced routing scheme, at least one corresponding entry in the table; and
cause the forwarding device to forward network traffic using the additional routing scheme by updating the network traffic distribution table of the forwarding device with the additional routing scheme.

14. The medium of claim 13, wherein each routing scheme defines how network traffic is to be distributed among multiple paths through the network.

15. The medium of claim 13, where the elimination test comprises:
   determining a magnitude of oversubscription created by reducing each of the portion of the routing schemes;
   comparing the magnitude of oversubscription of each of the portion of the routing schemes to a threshold value; and
   determining one or more routing schemes among the portion of the routing schemes based on the comparing.

16. The medium of claim 15, wherein the one or more determined routing schemes have lowest magnitudes of oversubscription among the magnitudes of oversubscription of the portion of the routing schemes.

17. The medium of claim 15, wherein more than one routing scheme is determined based on the comparing, the medium further storing one or more instructions that, when executed by the processor, cause the processor to:
   determine a reference count associated with each of the determined routing schemes, wherein the reference count is equal to number of routes using each routing scheme for forwarding the network traffic; and
   determine the remaining one or more routing schemes among the determined routing schemes such that the remaining one or more routing schemes have lowest reference counts.

18. The medium of claim 13, where the elimination test comprises:
   determining a magnitude of oversubscription created by reducing each of the portion of the routing schemes;
   comparing the magnitude of oversubscription of each of the portion of the routing schemes to a threshold value;
   determining two or more routing schemes among the portion of the routing schemes based on the comparing, wherein the two or more routing schemes have lowest magnitudes of oversubscription among the magnitudes of oversubscription of the portion of the routing schemes;
   determining a reference count associated with each of the two or more routing schemes, wherein the reference count is equal to number of routes using each routing scheme for forwarding the network traffic; and
   determining the remaining one or more routing schemes among the two or more routing schemes such that the remaining one or more routing schemes have lowest reference counts.

19. The medium of claim 13, wherein the routing schemes are weighted cost multipath (WCMP) groups.

20. The medium of claim 13, wherein the additional routing scheme is added to the table and the network traffic is rerouted using the additional routing scheme before removing an old routing scheme from the table.

\* \* \* \* \*